May 13, 1969  D. A. EVENSEN ET AL  3,443,584

BUOYANT ANTI-SLOSH SYSTEM

Filed Feb. 24, 1967

INVENTORS
DAVID A. EVENSEN
JOHN P. RANEY

BY
*McCoy*
*Wallace J. Nelson*
ATTORNEYS

United States Patent Office 3,443,584
Patented May 13, 1969

1

3,443,584
BUOYANT ANTI-SLOSH SYSTEM
David A. Evensen and John P. Raney, Newport News, Va., assignors to the United States of America as represented by the Administrator of the National Aeronautics and Space Administration
Filed Feb. 24, 1967, Ser. No. 619,519
Int. Cl. B64g 9/00; B65d 87/12
U.S. Cl. 137—582                                    2 Claims

ABSTRACT OF THE DISCLOSURE

A buoyant anti-slosh system using submerged baffles to inhibit liquid sloshing in a container as the container is subjected to forces normally inducing liquid movement relative to the container.

---

The invention described herein was made by employees of the United States Government and may by manufactured and used by or for the Government without the payment of any royalties thereon or therefor.

This invention relates to an anti-slosh system for damping the slosh normally occurring in a liquid container as the container is transported from one site to another. The invention relates particularly to a system for inhibiting liquid propellant sloshing and swirl in the tanks of liquid-propellant rockets during flight.

Liquid sloshing is a problem in the transporting of any liquid material from one site to another. It is a particular problem in liquid-propellant rockets, because the sloshing of the liquid in the tanks can cause the rocket to deviate from its normal course of flight and may impair or nullify an otherwise successful mission. Present methods of slosh damping involve the use of bulky and heavy weight slosh baffles attached to fuel tank sidewalls at various stations along the length of the tank. As the liquid fuel drains from the tank, the baffles above thhe liquid surface cease to function since they are no longer in contact with the fuel. Furthermore, the baffles far below the surface are of little value until the fluid level reaches them since the slosh modes are more prevalent along the surface of the liquid. The installation of a sufficient number of such baffles in a large liquid rocket tank also adds excess weight which, in turn, reduces the rocket payload capability.

Another prior art system for damping and controlling slosh of liquid in a container has involved capping of the liquid with complex and weighty controls being required to maintain the cap in position as the liquid level changes. These inherent disadvantages, as well as the weight penalty caused by having to position baffles completely along the length of the propellant fuel tank, demonstrate the need in the art for a simple, lightweight and efficient slosh damping system useful for liquid propellant rockets and the like.

The present invention is an attempt to combine the advantageous features of these known prior art systems while minimizing the disadvantages thereof.

Accordingly, it is an object of the present invention to provide a lightweight, reliable system for damping liquid slosh normally caused by vehicular movement.

Another object of the present invention is the provision of a floating baffle system for liquid propellant rockets wherein slosh modes will be damped at all liquid fuel levels.

Another object of the present invention is the provision of a surface float for liquid fuel tanks in which submerged structure is provided with the surface float to inhibit liquid sloshing.

Yet another object of the present invention is a baffle system adapted to be carried on the surface of the liquid fuel in each manner as to inhibit sloshing.

Another object of the present invention is a flotation unit adapted to remain on the surface of a liquid fuel in a tank at all fuel levels to inhibit vibration or sloshing of the liquid fuel.

According to the present invention the foregoing and other objects are attained by providing, in combination within a liquid fuel tank, a flotation unit adapted to remain on the surface of the liquid fuel at all fuel levels. A baffle structure is provided depending from the flotation unit and adapted to remain submerged in the liquid fuel to damp out slosh modes of the liquid as slosh-inducing forces are applied to the fuel tank. Thus, when slosh-producing forces are applied to the tank, as in maneuvering of the vehicle, the liquid surface of the propellant tends to vibrate or slosh, but the flotation unit is also caused to move. Since the surface floating unit is attached to submerged baffle structure, this is also set into motion and movement of the submerged baffle structure is resisted by the fluid beneath the surface. This resistance or damping force on the submerged baffle structure inhibits its motion and movement of the surface flotation unit as well as liquid slosh is consequently retarded. The surface flotation unit is also provided with surface baffles which, in turn, restrain the motion of the liquid surface and sloshing of the liquid surface is thereby inhibited. Stated differently, motions of the liquid surface are transmitted to the fluid below the surface by means of the buoyant-baffle system of the present invention. This transfer of motion gives rise to an agitated or turbulent movement of large masses of the liquid fuel which has the effect of damping surface motions and to thereby prevent or entirely inhibit liquid sloshing.

A more complete appreciation of the invention and many of the inherent advantages thereof will be more completely understood by reference to the following detailed description when considered in connection with the accompanying drawings wherein.

Figure 1:
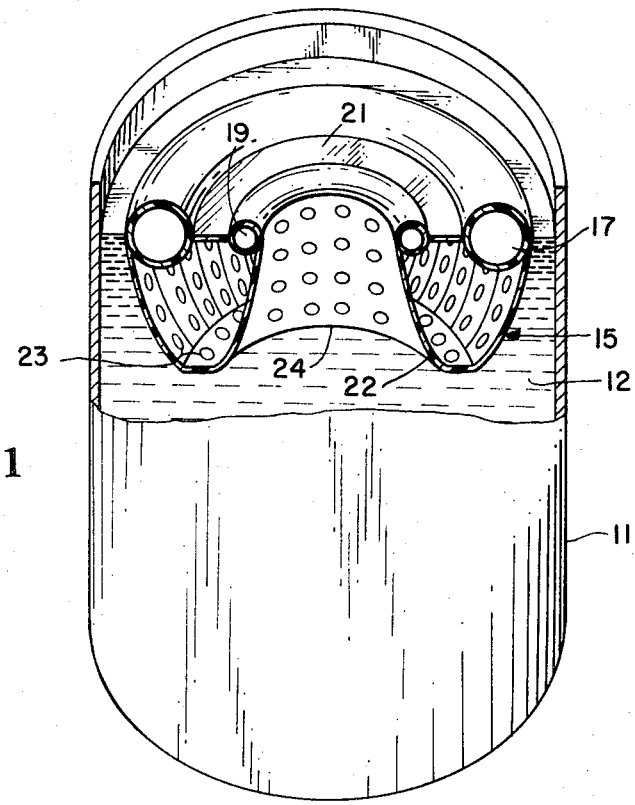
FIG. 1 is a somewhat perspective, part sectional view of a liquid container showing a buoyant anti-slosh system according to the present invention.

Referring now to the drawings wherein like numerals designate identical or corresponding parts throughout the several views, and most particularly to FIG. 1, there is shown a liquid container or fuel tank 11 containing the liquid fuel 12 therein. Tank 11 may be of any particular configuration and may serve as the fuel tank for liquid propellant rockets, or the like, or for any other liquid tank which is adapted to be transported from one site to another in which liquid sloshing might prove a handicap to successful transportation thereof. In this embodiment, a floating structure, generally designated by reference numeral 15, is disposed on the surface of the liquid fuel 12 to comprise the buoyant anti-slosh system of the present invention. In actual operation, container 11 could initially be completely filled with liquid fuel 12 and flotation structure 15 would be maintained against the top of the tank; however, the fuel level in tank 11 of FIG. 1 is shown at less than full capacity to more clearly illustrate the floating structure 15.

As shown in this sectional view, structure 15 includes a pair of concentric annular floats designated by reference numerals 17 and 19, respectively, with a membrane 21 attached to each of the annular floats and maintaining the floats in concentric relationship. A baffle structure 22, also of annular configuration, depends from floats 17, 19 and membrane 21 and spans the entire structure circumscribed by those members. Baffle structure 22 is provided with a plurality of perforations therethrough, two of which are designated by reference numeral 23, with a central opening 24 being also provided therein. Central opening 24 in floating structure 15 is of essentially the same diameter as the inner circumference of annular float 19 at its smallest end or where baffle structure 23 connects to the float, and of an increasing diameter to the tapered end of baffle structure 22. This baffle structure 22 is designed to be maintained submerged in liquid propellant 12 in tank 11 so as to inhibit movement of the floating structure which might be caused by liquid sloshing within the tank. Thus, although the floating structure is designed to move with the surface layer of the liquid fuel when slosh-inducing forces are imparted to container 11, the perforated baffle structure 22, which permits the flow of some liquid therethrough, will retard, or damp, any tendency of the liquid fuel to slosh above its normal surface area. Floats 17 and 19 are provided with an internal compartment containing air or other suitable flotation medium to assist in maintaining structure 15 on the liquid fuel surface. In addition, it is readily understandable that the entire structure 15 may be constructed of any suitable lightweight metal, plastics or like material that is chemically inert to the liquid fuel composition.

Figure 2:
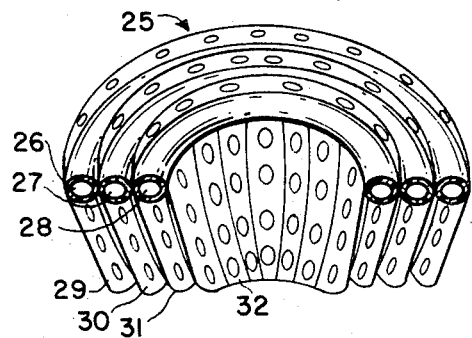
FIG. 2 is a part sectional view of a modified flotation unit and baffle system.

Referring now more particularly to FIG. 2, a modified floating structure is shown and designated generally by reference numeral 25. Structure 25 includes three concentrically arranged annular floats as designated by reference numerals 26, 27 and 28, respectively, with sleeve-like baffle structures being connected in-between each of the floats as well as along the interior of the innermost float and the exterior of the outermost float 26. These sleeve-like baffle structures are composed of any suitable flexible, perforated structure and extend slightly above the floating surfaces of floats 26, 27 and 28 and for a considerable distance beneath the surface of these floating members. The flexible baffle members are designated by reference numerals 29, 30, 31 and 32, and as shown in the figure, the lowermost portion thereof is slightly turned in toward the central axis of the flotation structure 25.

The operation of this embodiment is essentially the same as that previously described for the embodiment of FIG. 2. Thus, when a floating baffle such as 25 is positioned on the surface of a liquid fuel or the like, any tendency of the liquid to vibrate, slosh, or otherwise move along the surface area thereof is retarded by the screen-like baffles 29, 30, 31 and 32. In the event that flotation structure 25 becomes slightly tipped so as to immerse one side of the structure into the liquid fuel 12, the design of the baffle structure extending above the surface of floats 26, 27 and 28 will assist in retarding any slosh of the liquid while the flotation unit is in this position.

Figure 3:
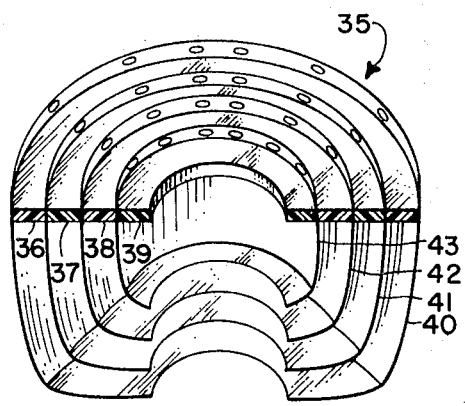
FIG. 3 is a part sectional view of another modified flotation unit and baffle system according to the present invention.

The floating structure 35, as illustrated in FIG. 3, is very similar to that shown in FIG. 2. In this embodiment, four washer-like floats are employed and include an exterior float 36, two intermediate floats 37 and 38 and an interior float 39. These floats are maintained in integral relationship by four nested cup-like baffle structures as designated by reference numerals 40, 41, 42 and 43, respectively, and of decreasing size. Thus, baffle 40 is connected to float 36 along the exterior circumference thereof with a slight portion of the baffle extending above the surface of the float and the cup-like portion thereof depending below the float and adapted to remain submerged in the liquid fuel 12 when employing flotation structure 35 as the buoyant anti-slosh system of the present invention.

Similarly, baffle 41 is attached to the exterior circumference of float 37 and the interior circumference of float 36, nested within and spaced slightly from baffle 40; baffle 42 is nested within and spaced slightly from baffle 41, attached to the interior circumference to float 37 and the exterior circumference of float 38; and, baffle 43 is nested within and spaced from baffle 42, attached to the interior circumference of float 38 and the exterior circumference of float 39. Each of the baffles is provided with an opening at the base thereof essentially of the same diameter as the interior diameter of float 39 and, when in the nested position, these baffle openings are in alignment with the opening of washer-like float 39. As in the previous embodiment, each of the baffle structures extends slightly above the floating surface of the floats. Baffles 40, 41, 42 and 43 may also be provided with a plurality of perforations through the surfaces thereof as so desired.

Figure 4:
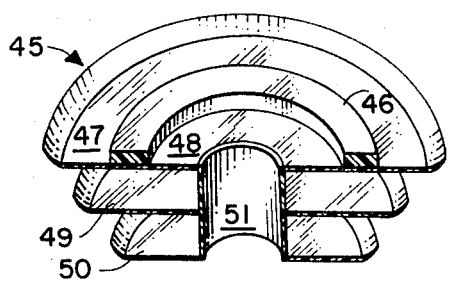
FIG. 4 is a part sectional view of a further modified baffle and flotation unit useful in the present invention.

Referring now more particularly to FIG. 4, another embodiment of the flotation structure which can serve as the buoyant anti-slosh system of the present invention is shown and generally designated by reference numeral 45. In this embodiment, a single washer-like float 46 is provided in integral connection with a thin rigid membrane washer 47 disposed along a plane with and fanned-out from the exterior circumference thereof, and a thin rigid washer-like membrane 48 extending along the same plane from the interior circumference thereof. Alternatively, the membranes 47, 48 may be integral and underly the float 46 as illustrated in the drawing. Depending from and integral with membrane washer 48 is a thin-walled circular cylinder 51 which serves as the support for the depending baffle structure. An intermediate and lower structure form a pair of decreasing diameter washer-like baffles 49 and 50. Each of baffles 49 and 50 is attached to the exterior of cylinder 51. As shown in FIG. 4, intermediate baffle structure 49 is of slightly smaller diameter than the exterior membrane 47, which floats on the surface of the liquid fuel, while lower baffle member 50 is of yet a smaller diameter than baffle member 49. The operation of this embodiment is essentially the same as that described hereinbefore for units 15, 25 and 35. Thus, any slosh mode acting on liquid 12 would be first imparted to baffle structure 50 which would tend, by its design, to retard movement of the liquid fuel with any movement thereof that is not completely retarded or damped being further retarded by baffle structure 49 prior to the movement or vibration of the liquid reaching the liquid surface to cause movement of the entire flotation structure 45.

Each of the flotation structures 15, 25, 35 and 45 described hereinbefore has been described with an opening through the longitudinal center thereof. This opening is designed to accommodate propellant lines which pass through the tank interior, essentially along the tank centerline, of some liquid propellant fuel tanks. These oxidizer-propellant lines are not shown in the drawings in the interest of clarity. In addition, it is to be understood that the outer edges in each embodiment of the flotation units described herein are of a flexible or resilient nature. This circumferential structural feature is essential to prevent puncture or damage to the tank wall. That is, in rocket flight, sudden changes in direction might cause the flotation unit to bump against the tank wall but due to the flexible or resilient exterior serving as a "bumper" no damage will be caused to the tank wall.

Each of the flotation structures 15, 25, 35 and 45 have also been shown and described as being of a slightly tapered configuration or a smaller diameter at the submerged end than at the floating surface. Some liquid propellant tanks are provided with circular ring stiffeners spaced along their interior surfaces (not shown) and the tapered design of the flotation units described herein readily slide by and not catch on these stiffeners as the fluid drains from the tank.

From the above description, it is readily apparent that the invention described herein provides a system which greatly reduces the weight of previous baffle systems in liquid transporting containers and a system that is reliable in use and cheap and easy to manufacture and maintain in operative condition. Although specific materials have not been described for construction of tank 11, it is readily apparent that any liquid container that is used presently to transport liquid from one site to another and in which slosh-inducing forces might be imparted thereto, are readily adaptable for use with the present invention. In the same light, no specific material has been described for the various flotation structures described and shown herein, it being understood that any suitable flotation material, such for example, inflatable structures or other buoyant means may be employed as the float units in the embodiments described with the only essential requirement being that the material used to construct the baffles and the floats must, by the very nature of the systems to which they are to be employed, be chemically inert to the liquid on which the floating structures are adapted to be maintained. Additionally, although the invention has been described as utilizing only one flotation unit in a tank, it is to be understood that the use of a plurality of flotation units to essentially cover or cap the liquid fuel surface is also considered within the scope of the present invention.

As described hereinbefore, in each of the embodiments of the present invention, the various tanks are designed so that in the beginning operation thereof, the tanks may be completely filled with the liquid fuel with the floating structure thereon being maintained adjacent the top surface of the tank. As the liquid level decreases due to fuel consumption and the like, the liquid level will move away from the top of the tank structure creating a void which normally causes or presents an area that permits sloshing of the liquid fuel. The present invention in which the buoyant anti-slosh system is maintained on the surface of the liquid level damps or inhibits the sloshing tendency by retarding any liquid motion, should the level surface of the liquid become disturbed by the sloshing mode.

Obviously, numerous modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The combination of a vehicle liquid fuel tank and a system for damping out liquid sloth normally caused by vehicular movement, said system comprising:
   at least one flotation unit adapted to remain on the surface of the liquid fuel at all fuel levels, said flotation unit including:
   (a) at least one pair of annular floats
   (b) means maintaining said floats in concentric relationship,
   (c) baffle means depending from said floats and adapted to remain submerged in the liquid fuel,
   said baffle and float combination serving to damp large amplitude first mode slosh and to substantially damp other slosh modes of said liquid fuel at all fuel levels as the fuel is consumed by said vehicle and otherwise subjected to slosh inducing forces due to vehicular movement, and
   wherein said means maintaining said floats in concentric relationship is an annular membrane and said baffle means is an annular structure spanning said annular floats and said membrane, said annular structure being provided with a plurality of perforations therein to permit fluid flow therethrough and thereby assist in the damping of slosh.

2. Apparatus for damping sloth of a liquid in a tank or the like comprising:
   a tank for containing and transporting liquid and adaptable for movement from one site to another site,
   means carried by said tank and supported on the surface of the liquid in said tank for damping slosh of said liquid as said tank is transported from one site to another,
   said means including integral floating and submerged structures,
   each of said structures forming liquid baffle means,
   said floating structure comprising an annular float,
   a pair of concentric membranes disposed, respectively, on the interior and exterior circumference of said annular float,
   a thin-walled cylindrical membrane integral with and depending from the opening of the interior concentric membrane, and,
   a pair of annular membranes integral with the exterior of said cylindrical membrane and disposed in spaced relationship along the length of said cylindrical membrane.

References Cited

UNITED STATES PATENTS

| 148,638 | 3/1874 | Wickoff | 220—26 |
| 1,294,265 | 2/1919 | Hirsch | 220—26 XR |
| 2,920,648 | 1/1960 | Sheffer | 137—582 |
| 3,110,318 | 11/1963 | Eulitz | 137—582 XR |

FOREIGN PATENTS

| 202,213 | 2/1966 | Sweden. |

DANIEL BLUM, *Primary Examiner.*

U.S. Cl. X.R.

73—116